United States Patent [19]
Sato et al.

[11] Patent Number: 5,252,440
[45] Date of Patent: Oct. 12, 1993

[54] METHACRYLIC RESIN COMPOSITION FOR OPTICAL DISCS

[75] Inventors: Fumio Sato, Otake; Yasunori Shimomura, Toyama; Masaaki Kishimura, Iwakuni, all of Japan

[73] Assignee: Mitsubishi Rayon Co., Ltd., Tokyo, Japan

[21] Appl. No.: 866,303

[22] Filed: Apr. 13, 1992

Related U.S. Application Data

[63] Continuation of Ser. No. 526,523, May 22, 1990, abandoned, which is a continuation of Ser. No. 147,659, Jan. 25, 1988, abandoned, which is a continuation of Ser. No. 916,692, Oct. 8, 1986, abandoned.

[30] Foreign Application Priority Data

Oct. 11, 1985 [JP] Japan ................. 60-226179

[51] Int. Cl.$^5$ ............................................. G03C 1/00
[52] U.S. Cl. ................................ 430/495; 430/270; 430/945; 346/135.1; 524/310; 524/312; 524/315; 524/317; 524/318; 524/385
[58] Field of Search ............ 524/310, 312, 315, 317, 524/318, 385; 346/135.1; 430/270, 495, 945

[56] References Cited

U.S. PATENT DOCUMENTS 2,939,898  6/1960  Aron ............................... 524/385
4,481,324  11/1984  Hall et al. ........................ 524/312
4,510,279  4/1985  Kishimura et al. .

FOREIGN PATENT DOCUMENTS 0105562   4/1984  European Pat. Off. ............ 524/318
0160285  11/1985  European Pat. Off. .
2531963   6/1976  Fed. Rep. of Germany .
57-123208  7/1982  Japan .
57-138601  8/1982  Japan .
1575625   9/1980  United Kingdom .

OTHER PUBLICATIONS

European Patent Office Communication.
Patent Abstracts of Japan, unexamined applications, C.field, vol. 6, No. 219, Nov.2,1982 p. 96 C. 132.

Primary Examiner—Joseph L. Schofer
Assistant Examiner—Peter D. Mulcahy
Attorney, Agent, or Firm—Oblon, Spivak, McClelland, Maier & Neustadt

[57] ABSTRACT

A methacrylic resin composition for optical discs comprising 100 parts by weight of a copolymer composed of from 95 to 99.7% by weight of methyl methacrylate (A) and from 0.3 to 5% by weight of at least one monomer (B) selected from the group consisting of methyl acrylate, ethyl acrylate and butyl acrylate, and having a heat distortion temperature of at least 95° C., a melt flow rate of from 1.0 to 10.0 g/10 min and a tensile strength of at least 660 kg/cm$^2$, and from 0.05 to 2.0 parts by weight of at least one releasing agent (C) selected from the group consisting of a fatty acid alkyl ester of the formula $R_1COOR_2$ wherein each of $R_1$ and $R_2$ is an alkyl group having from 5 to 20 carbon atoms, cetanol and a stearic acid glycerol ester.

7 Claims, No Drawings

METHACRYLIC RESIN COMPOSITION FOR OPTICAL DISCS

This application is a continuation of Ser. No. 07/526,523, filed May 22, 1990, which is a continuation of Ser. No. 07/147,659, filed Jan. 25, 1988, which is a continuation of Ser. No. 06/916,692, filed Oct. 8, 1986, now all abandoned.

The present invention relates to a methacrylic resin composition for use in optical discs such as a video disc or a memory disc wherein a laser beam is employed.

A methacrylic resin is used for optical video discs for its excellent properties such as transparency and weathering resistance. As the prior art relating to a methacrylic resin copolymer for video discs, Japanese Unexamined Patent Publications No. 123208/1982 and No. 138601/1982 may be mentioned. In Japanese Unexamined Patent Publication No. 123208/1982, a copolymer of methyl methacrylate with ethyl acrylate is proposed to satisfy the processability, birefringence and mechanical strength. However, the heat distortion temperature is at most 92° C. in each case, and the heat distortion resistance is still inadequate. Further, the mechanical strength is still inadequate. Whereas, Japanese Unexamined Patent Publication No. 138601/1982 discloses a copolymer of methyl methacrylate with an alkyl acrylate or alkyl methacrylate having an alkyl group with from 1 to 12 carbon atoms. However, within the range defined by the intrinsic viscosity and the heat distortion temperature, there have been problems such that as the heat distortion temperature is raised, the intrinsic viscosity tends to be low and the mechanical strength tends to deteriorate whereby cracking is likely to take place when released from the mold, and if the molding property or the mechanical strength is maintained, the heat distortion temperature tends to be low.

On the other hand, there has been a strong demand from the market for a product having excellent transferability and releasability from the mold, and also superior heat resistance and mechanical strength, but such a demand has not been satisfied.

Under the circumstances, the present inventors have conducted extensive researches to develop a methacrylic resin composition for optical discs having excellent heat resistance at a level of a heat deformation temperature of 95° C. as well as excellent releasing properties, transfer properties and mechanical strength, and as a result, have found that a product obtained by incorporating a releasing agent to a copolymer having the following physical properties can be used as an excellent material for optical discs. The present invention has Thus, the present invention provides an optical information recording material comprising 100 parts by weight of a copolymer composed of from 95 to 99.7% by weight of methyl methacrylate (A) and from 0.3 to 5% by weight of at least one monomer (B) selected from the group consisting of methyl acrylate, ethyl acrylate and butyl acrylate, and having a heat distortion temperature of at least 95° C., a melt flow rate of from 1.0 to 10.0 g/10 min and a tensile strength of at least 660 kg/cm$^2$, and from 0.05 to 2.0 parts by weight of at least one releasing agent (C) selected from the group consisting of a fatty acid alkyl ester of the formula R$^1$COOR$_2$ wherein each of R$_1$ and R$_2$ is an alkyl group having from 5 to 20 carbon atoms, cetanol and a stearic acid glycerol ester.

Now, the present invention will be described in detail with reference to the preferred embodiments.

Methyl methacrylate as a component of the copolymer of the present invention, is required to provide the inherent properties of a methacrylate resin, such as the weathering resistance, transparency, heat resistance and mechanical strength. It is used usually within a range of from 95 to 99.7% by weight, preferably from 97 to 99.5% by weight. If the amount is less than 95% by weight, the heat distortion temperature tends to be low, such being undesirable. On the other hand, if the amount exceeds 99.7% by weight, the heat decomposition resistance tends to be inferior, and silver streaks are likely to form during the molding, whereby it becomes difficult to obtain a satisfactory product.

The acrylate as a component of the copolymer of the present invention is used to improve the heat decomposition resistance of the copolymer and to improve the flow precessability. It is used in an amount of from 0.3 to 5.0% by weight. If the amount is less than 0.3% by weight, the heat decomposition resistance and flow processability tend to be inferior, and if the amount exceeds 5.0% by weight, the heat distortion temperature tends to be low although the heat decomposition resistance and the flow processability may be improved. The amount is preferably from 0.5 to 3.0% by weight.

In the present invention, the heat distortion temperature is measured under a load of 18.56 kg in accordance with ASTM D-648; the melt flow rate is measured under a load of 3.8 kg in accordance with ASTM D-1238; and the tensile strength is measured in accordance with ASTM D-638.

In the present invention, the heat distortion temperature is at least 95° C., because a heat is applied for the vacuum deposition of aluminum during the process for the preparation of discs and the heat resistance is required. Also in a practical use, the product is likely to undergo a deformation in a high temperature environment such as in a vehicle, if the heat distortion temperature is less than 95° C. Therefore, higher heat resistance is required.

In the present invention, the melt flow rate of the copolymer is from 1.0 to 10.0 g/10 min. This is necessary to minimize the birefringence and the transfer properties of the information from the mold during the molding operation. If it is less than 1.0 g/10 min, the transfer properties of information will be inferior and the double refraction will increase, whereby in the practical use, noises or dropouts will be brought about to such an extent that the product is no longer practically useful. The melt flow rate is preferably from 1.5 to 6.0 g/10 min.

In the present invention, the tensile strength of the copolymer is required to be at least 660 kg/cm$^2$. If the tensile strength is less than 660 kg/cm$^2$, there will be a problem that cracking is likely to take place during the molding operation, since discs having a thickness of about 1.5 mm are molded under high temperature and high pressure conditions. If it exceeds 800 kg/cm$^2$, the molecular weight will be so large that the flowability will be poor and the transfer properties tend to be inferior, such being undesirable.

A further feature of the present invention is that by adding at least one releasing agent selected from the group consisting of a fatty acid alkyl ester of the formula R$_1$COOR$_2$ wherein each of R$_1$ and R$_2$ is an alkyl group having from 5 to 20 carbon atoms, cetanol and a stearic acid glycerol ester in an amount of from 0.05 to 2.0 parts by weight relative to 100 parts by weight of the copolymer, it is possible to obtain a methacrylate resin having excellent heat resistance with a heat distortion temperature of from 95° to 104° C., which used to be hardly obtainable, and to use such a resin as a material for optical discs. If the amount of the releasing agent incorporated is less than 0.05 part by weight, the releasing properties tend to be inferior, and if it exceeds 2.0 parts by weight, the heat distortion temperature tends to be low, such being undesirable. The amount of the releasing agent is preferably from 0.1 to 0.5 part by weight.

Specific examples of a fatty acid monohydric alcohol ester include stearyl stearate, lauryl stearate, isotridecyl stearate, stearyl palmitate and myristyl myristate. The stearic acid glycerol ester includes a monoester, a diester and a triester.

Further, the copolymer of the present invention preferably contains from 0.01 to 0.3 part by weight (relative to 100 parts by weight of the copolymer) of a dimer of methyl methacrylate in view of the flow processability, double refraction and transfer properties.

The molding material of the present invention is useful not only as a base material for information recording media such as video discs, audio discs or memory discs, but also for optical devices such as lenses or prisms by virtue of its excellent heat resistance.

For the preparation of the molding material of the present invention, conventional processes for the production of acrylic resins such as suspension polymerization or bulk polymerization, may be employed. Further, to the copolymer of the present invention, additives such as dyestuffs or pigments may also be incorporated, as the case requires.

Now, the present invention will be described in further detail with reference to Examples. However, it should be understood that the present invention is by no means restricted to these specific Examples.

The various properties were measured in accordance with the following methods.
(1) Heat distortion temperature (HDT)
   ASTM D-648, load: 18.56 kg (264 psi)
(2) Melt flow rate (MFT)
   ASTM D-1238, load: 3.8 kg
(3) Tensile strength
   ASTM D-638, Dumbbell A specimens
(4) Heat decomposition resistance
   By using Nikko V 17-65 model injection molding machine, a sheet of 2 mm × 110 mm × 110 mm was molded at a cylinder temperature of 280° C. in a cycle of 50 seconds, whereupon silver streaks were visually examined.
(5) Release properties
   By using Meiki Dinameltor ® injection molding machine and, as a mold, a disc having a thickness of 1.2 mm, a diameter of 300 mm, a track distance of 1.6 μm, a track width of 0.5 μm and a track groove depth of 0.3 μm, injection molding was conducted at a cylinder temperature of 270° C. at a mold temperature of 70° C. and in a cycle of 60 seconds, whereupon the number of defective discs (cracking, etc.) among 20 shots, was counted for evaluation.

In the following Examples and Comparative Examples, "parts" means "parts by weight".

EXAMPLES 1 to 4 and COMPARATIVE EXAMPLES 1 to 4

To 100 parts of a mixture of monomers in the proportions as shown in Table 1, 0.30 part of n-octyl mercaptan as a chain transfer agent and 0.1 part of azobisisobutyronitrile as a polymerization initiator, were dissolved, and the resulting solution was mixed to 150 parts of pure water having dissolved therein 0.5 part of sodium sulfate and 0.01 part of a copolymer of methyl methacrylte with sodium 2-sulfoethylmethacrylate, as a suspension polymerization dispersant. The mixture was charged into a separable flask equipped with a condenser, a stirrer and a thermometer and polymerized at 80° C. After the internal temperature reached the maximum point, the mixture was maintained at 115° C. for 10 minutes, then cooled, filtered, washed and dried. Then, 100 parts of polymer beads thus obtained and 0.5 part of monoglycerol stearate were blended. The blend was molded at 240° C. under a pressure of −750 mmHg by a 40 φ single full flight extruder manufactured by Nikko, and then pelletized. This pelletized polymer was molded into dumbbell A specimens by Nikko V 17-65 model injection machine, and the tensile strength was measured. For the measurements of HDT and MFR, pellets were used. The results of the evaluation in the respective Examples and Comparative Examples are shown in Table 1.

TABLE 1

| | Copolymer composition (%) | | HDT (°C.) | MFR g/10 min | Tensile strength kg/cm² | Heat decomposition resistance | Release properties* |
|---|---|---|---|---|---|---|---|
| | MMA | Alkyl acrylate | | | | | |
| Example 1 | 99 | MA 1.0 | 102 | 4.0 | 710 | No silver streak | Good 0 |
| Example 2 | 99 | EA 1.0 | 100 | 5.0 | 706 | " | Good 0 |
| Example 3 | 99 | BA 1.0 | 99 | 5.5 | 700 | " | Good 0 |
| Example 4 | 97 | MA 3.0 | 99 | 7.0 | 690 | " | Good 0 |
| Comparative Example 1 | 100 | — — | 100 | 3.5 | 730 | Silver streaks appeared | — |
| Comparative Example 2 | 92 | MA 8.0 | 88 | 13.8 | 640 | No silver streak | Good 0 |
| Comparative Example 3 | 92 | EA 8.0 | 85 | 15.2 | 620 | " | Good 0 |
| Comparative Example 4 | 92 | BA 8.0 | 82 | 17.0 | 620 | " | Good 0 |

*Number of defective products
MA: Methyl acrylate
EA: Ethyl acrylate
BA: Butyl acrylate

EXAMPLES 5 to 8 and COMPARATIVE EXAMPLE 5

Each material was prepared in the same manner as in Example 1 except that a releasing agent as identified in Table 2 was employed, and the physical properties were evaluated. The type and amount of the releasing agent, and the results of the evaluation of the physical properties, are shown in Table 2.

TABLE 2

| | Releasing agent Type and amount | | HDT (°C.) | MFR g/10 min | Tensile strength kg/cm² | Heat decomposition resistance | Release properties* |
|---|---|---|---|---|---|---|---|
| Example 5 | Cetanol | 0.5 | 102 | 4.2 | 700 | No silver streak | Good 0 |
| Example 6 | Stearyl stearate | 0.5 | 102 | 4.0 | 710 | " | Good 0 |
| Example 7 | Monoglycerol stearate | 0.1 | 103 | 4.0 | 710 | " | Fair 2 |
| Example 8 | Monoglycerol stearate | 1.0 | 100 | 4.5 | 700 | " | Good 0 |
| Comparative Example 5 | Nil | | 103 | 3.9 | 710 | " | No good 16 |

*Number of defective products

EXAMPLE 9

A mixture comprising 98 parts of methyl methacrylate, 2 parts of methyl acrylate, 0.30 part of n-octyl mercaptan, 0.5 part of lauroyl peroxide, 0.01 part of a copolymer of methyl methacrylate with sodium sulfoethylmethacrylate, 0.5 part of sodium sulfate and 150 parts of pure water, was polymerized at 80° C. in a 50 liter pressure resistant polymerization tank. After the internal temperature reached the maximum, the mixture was maintained at 115° C. for 15 minutes, then cooled and dried. To 100 parts of polymer beads thus obtained, 0.4 part of cetanol and 0.1 part of stearyl alcohol were added, and the mixture was molded and pelletized at 240° C. under a vent pressure of −750 mmHg by a PCM 45 extruder manufactured by Ikegai K.K.

The pelletized polymer was molded into discs having a diameter of 130 mm and a thickness of 1.2 mm at 270° C. by a 75 E model injection molding machine manufactured by Toshiba Kikai K.K. The retardation at from 25 to 62 mm from the center, was not higher than 7 nm in a single pass, thus indicating excellent optical properties. Further, in the same manner as in Example 1, the tensile strength, HDT and MFR were measured, and found to be 705 kg/cm², 101° C. and 5.8 g/10 min, respectively.

EXAMPLE 10

The operation was conducted in the same manner as in Example 9 except that the releasing agent was changed to 0.4 parts of monoglycerol stearate. The double refraction was not higher than 5 nm, and the tensile strength, HDT and MFR were the same as in Example 9.

The light transmittance within a wavelength region of from 500 to 1000 nm in each of Examples 1 to 10, was at least 92% (as measured by Hitachi Spectrometer Model 330). The phase shift at a distance of 75 mm from the center of the disc used for the evaluation of the release properties, was measured by a polarization microscope NIKON OPTIPHOT-POL model, manufactured by Nippon Kogaku K.K. by means of a Pellek Compensator manufactured by REIZ Co. under a sodium D beam or by a tungsten lamp, whereby the phase shift was found to be not higher than 20° in each case.

Thus, the composition of the present invention are also excellent in the optical properties.

As is evident from the above results, the compositions of the respective Examples have high heat resistance and excellent optical properties, heat decomposition resistance and release properties, and they are suitable for use as materials for optical information recording media.

I claim:

1. An optical information recording material comprising 100 parts by weight of a copolymer composed of from 95 to 99.7% by weight of methyl methacrylate (A) and from 0.3 to 5% by weight of at least one monomer (B) selected from the group consisting of methyl acrylate, ethyl acrylate and butyl acrylate, and having a heat distortion temperature of at least 95° C., a melt flow rate of from 1.0 to 10.0 g/10 min and a tensile strength of at least 660 kg/cm², and from 0.05 to 2.0 parts by weight of at least one releasing agent (C) selected from the group consisting of an alkyl stearate and monoglycerol stearate.

2. The optical information recording material according to claim 1, wherein the monomer (B) is methyl acrylate.

3. The optical information recording material according to claim 1, wherein the melt flow rate is from 1.5 to 6.0 g/10 min.

4. The optical information recording material according to claim 1, wherein the releasing agent (C) is incorporated in an amount of from 0.1 to 0.5 part by weight.

5. The optical information recording material according to claim 1, wherein the alkyl stearate if stearyl stearate.

6. The optical information recording material according to claim 1, wherein said copolymer is composed of 97 to 99.5% by weight methylmethacrylate and 0.5 to 3.0% by weight monomer (B).

7. The optical information recording material according to claim 1, having a heat distortion temperature of from 95° to 104° C.

* * * * *